(No Model.)
T. P. CONANT.
DISTRIBUTION OF ELECTRICITY BY SECONDARY BATTERIES.
No. 394,642. Patented Dec. 18, 1888.
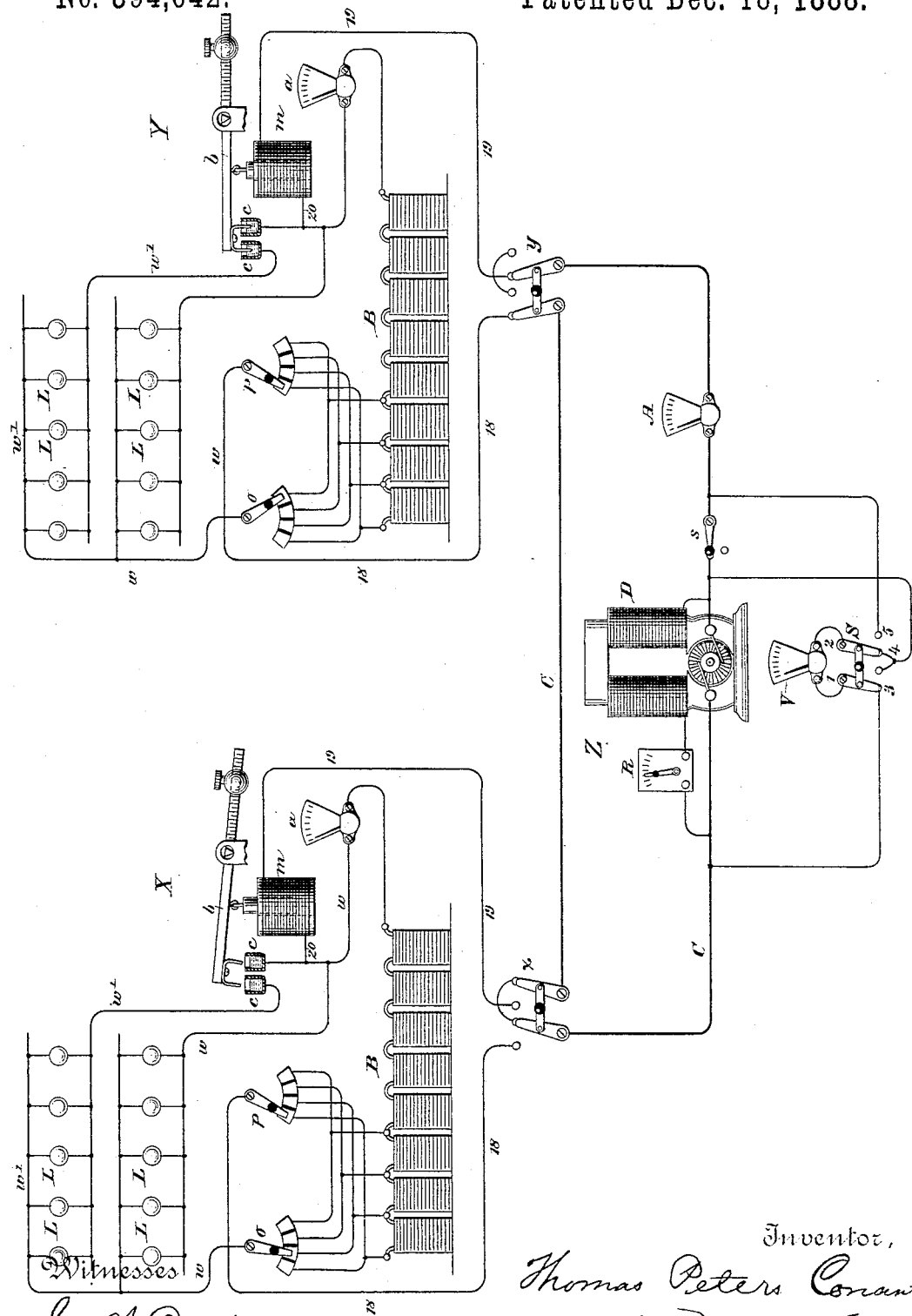
Witnesses
Geo. W. Breck.
Carrie E. Ashley.
Inventor,
Thomas Peters Conant
By his Attorney Wm B. Vansize

United States Patent Office.

THOMAS PETERS CONANT, OF NEW YORK, N. Y., ASSIGNOR TO THE ELECTRICAL ACCUMULATOR COMPANY, OF NEW YORK.

DISTRIBUTION OF ELECTRICITY BY SECONDARY BATTERIES.

SPECIFICATION forming part of Letters Patent No. 394,642, dated December 18, 1888.

Application filed October 25, 1888. Serial No. 289,136. (No model.)

*To all whom it may concern:*

Be it known that I, THOMAS PETERS CONANT, a citizen of the United States, and a resident of New York, in the county of New York and State of New York, have invented certain new and useful Improvements in the Distribution of Electricity by Secondary Batteries, of which the following is a specification.

My invention is an improvement in the distribution of electricity by secondary batteries.

The invention relates to that particular system of distribution in which the dynamo and batteries located at a series of sub-stations jointly furnish the current during periods of maximum consumption. The dynamo operates nearly continuously, charging the battery during the time that little or no current is used in the working-circuits, and then when the maximum current is required both dynamo and batteries contribute to furnish the supply. It occasionally happens, however, during the period of maximum consumption, when both dynamo and batteries are being drawn upon, that the dynamo fails either from a stoppage or a break in the main circuit, and this leaves the entire work to be done by the battery, thus permitting a higher discharge rate than the battery is qualified to furnish, and this results in injury to the battery. Further, in this system of distribution it occasionally becomes necessary or desirable to charge the battery at one station for a longer period than is necessary in case of those at other stations, and my arrangement of apparatus is adjustable to meet this requirement.

My improvement consists in dividing the working-circuit into two sections—one to be supplied by the battery, the other by the dynamo when operating to supplement the battery. In the working-circuit I place an automatic switch operated by an adjustable electro-magnet which is located in circuit between the dynamo and battery. When the proper current is flowing from the dynamo, the switch is closed and the section of the working-circuit to be fed by the dynamo is connected; but the moment such current from the dynamo fails the said switch opens and the dynamo-section of the working-circuit is disconnected. This avoids possible injury to the battery from the causes mentioned.

I have also devised an improved arrangement for starting the dynamo into operation in the process of charging the secondary batteries, whereby an indicating-instrument may be introduced at one point to indicate the relation between the current from the dynamo and the current from the batteries at the substations, and at another point to indicate the electro-motive force of the dynamo.

The accompanying drawing illustrates my invention.

D is a primary generator of electricity—such as a dynamo—located at a central station, Z.

X and Y are sub-stations, connected with the central station, Z, by an electrical conductor or charging-circuit, C. At the sub-stations there are appropriate switches, $x$ and $y$, for connecting and disconnecting the charging-circuit C with the batteries B for the purpose of receiving a charge, and with the working-circuit for the purpose of supplying those translating devices L in the working-circuit $w$ $w'$ which are in excess of that number which the battery can be safely drawn upon to supply.

$o$ and $p$ are regulating-switches for changing the number of cells in the working-circuit and in the charging-circuit, respectively.

The working-circuit $w$ $w'$ is in two sections, $w$ containing those lamps L which can safely be supplied by the battery. $w'$ contains the lamp L in excess of what the battery can safely supply, and for the supply of which the dynamo furnishes current jointly with the battery.

18 19 20 is a section of conductor connected to opposite terminals of the battery and to the switch for including said battery and working-circuit in the charging-circuit.

$m$ is an electro-magnet, preferably in the form of a solenoid. It is located in circuit 19 20 between the primary generator and battery. Its armature-bar $b$ has upon one end a graduated scale and a movable weight for adjusting the retracting power. Upon the other end is a U-shaped copper rod, arranged so that its opposite ends dip into two mercury-cups, $c\ c$, in a well-known manner. These mercury-cups form the terminals of the divided section of the working-circuit $w'$, and the mercury-cups and U-shaped rod form a circuit-breaker. There is an ammeter, $a$, in each working-circuit $w$ to indicate the rate of discharge from the battery.

As shown in the drawing, the sub-station X is disconnected from the charging-circuit, magnet $m$ is deprived of electrical current, its armature is retracted, and the section of the working-circuit $w'$ is broken. The section of working-circuit $w$ is supplied from the battery. The sub-station Y, however, is connected to the charging-circuit, its magnet $m$ is energized by the current flowing in conductor 19, and the section of working-circuit $w'$ is closed, so that both sections $w$ and $w'$ are jointly supplied by the battery and the charging-circuit. If now, while both battery and charging-circuit are supplying electricity to the lamps L L in the circuit $w\ w'$, the charging-circuit is interrupted, as by a break or the failure of the dynamo for any cause, the entire "load" in the circuit $w\ w'$ would be thrown onto the battery, causing a high and injurious rate of discharge, were it not for the presence of the circuit-breaker in the working-circuit $w'$, under control of magnet $m$. As soon as current fails or falls below a certain point in circuit C, or when conductor 19 is disconnected at switch $y$, the armature $b$ is retracted and circuit $w$ is broken at $c\ c$, thus disconnecting a portion of the working-circuit from battery B. There remains only such portion of the entire working-circuit $w$ as battery B can safely supply. The adjustable retractor on the armature-bar $b$ makes it possible to produce a break in circuit $w'$ when any predetermined variation of current is produced in the charging-circuit—that is, magnet $m$ may be caused to operate when the charging-current drops below, say, ten ampères, instead of totally failing.

At the central station, Z, there is an ammeter, A, in the charging-circuit and a rheostat, R, in the shunt-circuit containing the field-coils of the dynamo. When starting the dynamo, its electro-motive force must be raised to a point exceeding the electro-motive force of the batteries then included in the circuit at certain sub-stations, the number of which is presumably unknown—that is, a portion may be in and the remainder out of circuit. It is necessary, therefore, to determine this question relatively.

V is an indicating-instrument, as a voltmeter.

S is a five-point switch, two contacts being movable and respectively connected to the terminals of the voltmeter V.

$s$ is a circuit-breaker in the charging-circuit. From opposite sides of this circuit-breaker or switch $s$ electrical connection is made with two fixed contacts, 4 and 5, of the switch S. By breaking circuit at $s$ and moving points 1 and 2 of S onto points 4 and 5 the meter V is included in circuit C in series with the dynamo. Then by manipulating rheostat R the electro-motive force of D is raised to a point where, as indicated by V, it exceeds the counter-electro-motive force of the batteries in the charging-circuit. Contact-point 3 of switch S is electrically connected to the opposite poles of the dynamo, and by closing switch $s$ and moving points 1 and 2 of S onto points 3 and 4 the voltmeter V is connected to opposite terminals of dynamo D in the closed charging-circuit C, and its absolute electro-motive force ascertained. I thus approximately determine the number of cells of battery in the charging-circuit and the condition of such circuit more accurately and more expeditiously than by any process now known.

What I claim, and desire to secure by Letters Patent, is—

1. The combination of a primary generator of electricity, a charging-circuit, a secondary battery to be supplied from said circuit, a working-circuit containing a series of translating devices—such as lamps—a switch or circuit-breaker located between the battery and translating devices for making and breaking said working-circuit, and an electro-magnet located between the primary generator and battery operated by variations in current in the charging-circuit to control said switch, substantially as described.

2. The combination of a primary generator of electricity, a charging-circuit, a secondary battery to be supplied from said circuit, a working-circuit in two sections, each containing translating devices, a switch or circuit-changer located in one section of said working-circuit between the battery and translating devices for varying the connection of said section with respect to the battery, and an electro-magnet located between the primary generator and battery operated by variations in current in the charging-circuit to control said switch, substantially as described.

3. The combination of a primary generator of electricity, a charging-circuit, a secondary battery to be supplied with electricity from said circuit, a working-circuit containing a series of translating devices, a switch or circuit-changer located in said working-circuit, an electrical conductor for connecting the battery with the charging-circuit, a switch for making and breaking the connection of said conductor with the charging-circuit, and an electro-magnet located in said conductor between said switch and secondary battery operated by variations of current in said conductor to control the switch or circuit-changer located in the working-circuit, substantially as described.

4. The combination of a dynamo-electric machine located at a central station, a charging-circuit connecting said central station with two or more sub-stations, a secondary battery at each sub-station to be supplied with electricity from said circuit, a working-circuit at each sub-station divided into two sections, translating devices, as lamps, in each section, a switch or circuit-breaker in one section of each working-circuit, and an electro-magnet for each such circuit-breaker located in the charging-circuit between the dynamo and battery operated by variations of current in said circuit to control said switch, substantially as described.

5. The combination of a primary generator of electricity, an indicating-instrument, as a voltmeter, and a five-point switch, two contacts of said switch being connected to the opposite terminals of said indicating-instrument, two other contacts being connected to opposite terminals of the primary generator, a third contact connected to the main circuit in proximity to the dynamo, and a circuit-breaker in the charging-circuit between the two connections occurring upon one and the same side of the dynamo, as and for the purpose described.

Signed at the city of New York, in the county of New York and State of New York, this 20th day of October, A. D. 1888.

THOMAS PETERS CONANT.

Witnesses:
WM. B. VANSIZE,
DANIEL E. DELAVAN.